Aug. 13, 1940.　　　　G. BOELMAN　　　　2,211,049
TRACTOR GUIDE
Filed Feb. 16, 1939　　　2 Sheets-Sheet 1
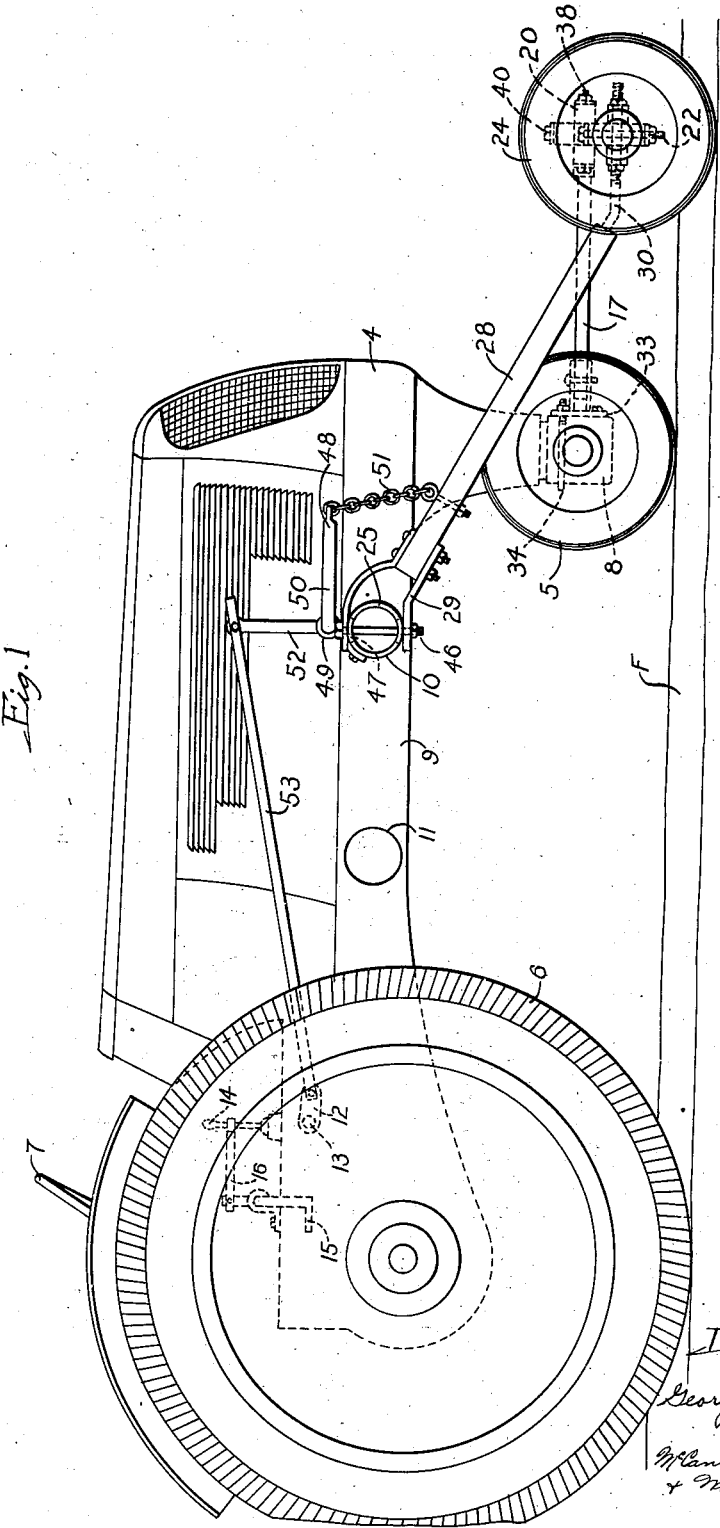
Inventor:
George Boelman
McCanna, Wintercorn
& Morsbach
Attys.

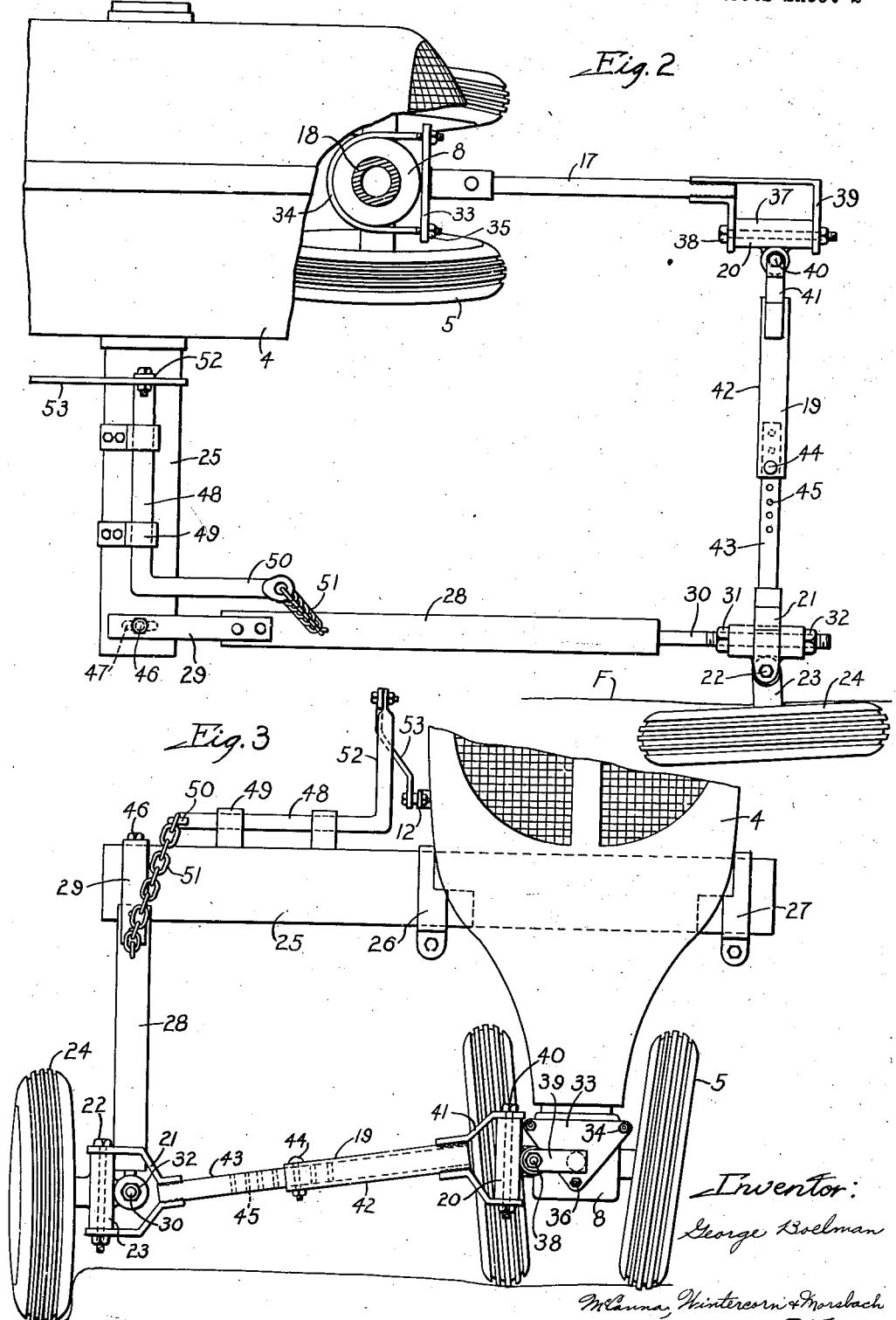

Patented Aug. 13, 1940

2,211,049

UNITED STATES PATENT OFFICE 2,211,049

TRACTOR GUIDE

George Boelman, Shell Rock, Iowa, assignor of one-half to George Dieterman, Freeport, Ill.

Application February 16, 1939, Serial No. 256,675

16 Claims. (Cl. 97—49)

This invention relates to a new and improved tractor guide.

The principal object of my invention is to provide a tractor guide of simple, practical, and economical construction, one which takes up very little room out in front of the tractor, and will, therefore, permit plowing up close to the fence at the end of the furrows, because of the small turning radius that is possible with this guide.

The present guide, in accordance with my invention, comprises a steering shaft attached to the steering post and extended forwardly, and a tractor guide supporting crossbeam attached to the tractor frame so as to extend laterally from the tractor behind the dual front steering wheel, together with a laterally reaching arm having a universal joint connection at one end with the steering shaft and a vertical pivotal connection at the other end with the king bolt on the guide wheel spindle, and another arm reaching forwardly from the outer end of the crossbeam and having a universal joint connection at its rear end with the beam and a horizontal pivotal connection at its forward end with the guide wheel spindle, whereby a parallelogram guide structure is formed in which the steering shaft and the last named forwardly reaching arm always remain approximate parallelism and the guide wheel when running in the furrow keeps the tractor running straight ahead on a line parallel with the furrow, without the operator's attention. The universal joints also permit raising the guide wheel out of the furrow by means of the forwardly reaching arm so that the tractor can be driven to and from the field to be plowed, the parallelogram structure under these circumstances being particularly advantageous because of the sharp turns permitted and the fact that the guide wheel under these conditions moves in close to the tractor and is, therefore, not apt to get caught on a fence or some other obstruction. The parallelogram structure is furthermore easily adjustable, in accordance with my invention, to locate the guide wheel closer to or out farther from the dual front steering wheel, by simply adjusting the length of the laterally reaching arm and slidably adjusting the crossbeam with respect to the tractor frame.

Another feature of the present guide is the provision on the cross beam of a crank for elevating the guide wheel, the crank having connection on the one hand with the forwardly reaching arm and on the other hand with the power operable trip lever, provided on those tractors equipped for power lift of plows and the like, the same operating through a half revolution on each operation in response to depression of a foot pedal and being, therefore, adapted for the present purposes to lift the guide wheel in one operation and lower it in the next.

The invention is illustrated in the accompanying drawings, in which—

Fig. 1 is a side view of a tractor equiped with my improved guide;

Fig. 2 is a plan view of the guide structure showing just enough of the front end of the tractor to illustrate the mode of attachment thereto, and Fig. 3 is a front view of Fig. 1 showing all of the guide structure, but with a portion of the tractor broken away.

The same reference numerals are applied to corresponding parts throughout the views.

The tractor indicated by reference numeral 4 is a so-called Row crop type tractor, having a dual front steering wheel 5 below the middle of the front end of the tractor, midway between the rear drive wheels 6, so that the front wheel travels between two rows and the rear wheels straddle those rows. 7 is the steering wheel having the usual operating connection with the steering post on whose lower end 8 are provided axles for the two wheels forming the dual steering wheel 5. Certain tractors of this kind have on the frame 9 thereof transverse holes 10 and 11 through which crossbeams may be entered to project from opposite sides of the tractor for the mounting of attachments for cultivating and other purposes. Those having power lifts also come equipped with trip lever 12 turned by means of a shaft 13 through a half revolution in each operation when the clutch associated therewith (not shown) is engaged either by operation of the hand lever 14 or depression of the foot pedal 15, the hand lever and foot pedal being interconnected as at 16 so that either may be operated to cause a half turn of the trip lever 12 under power of the tractor's engine. The tractor guide of my invention has been designed with a view to utilizing to advantage these features of the tractor so that these guides may be sold to farmers and applied to existing tractors without difficulty and at an appreciable saving in cost over what would be involved in a tractor guide not designed to use existing equipment.

The tractor guide of my invention is in the form of a parallelogram structure consisting of a steering shaft 17 attached to the lower end 8 of the steering post 18 and extending forwardly from the dual front steering wheel 5; a laterally reaching arm 19 having a universal joint connection 20 at one end with the front end of the steering shaft 17 and pivotal connection at its other end by means of a fork 21 with the king bolt 22 in the vertical portion of the steering spindle 23 on the guide wheel 24; a tubular crossbeam 25 entered in the front holes 10 in the tractor frame and fastened in place against endwise or rotary movement relative to the tractor frame by clamps 26 and 27 on said beam on opposite sides of the frame, and a forwardly reaching arm 28 having at one end a universal pivotal connection by means of its fork 29 with the outer end of the beam 25 and having an adjustable pivotal connection at its other end with the horizontal cross portion of the spindle 23 of the guide wheel 24 by means of the bolt 30 and nuts 31 and 32. The guide wheel 24 is toed in slightly to keep crowding against the land side of the furrow indicated at F in Fig. 2. The wheel 24 is disposed in fore and aft alignment with the right hand rear wheel 6 of the tractor, which as indicated in Fig. 1 runs in the furrow. Of course, while I prefer the use of a guide wheel, it is obvious a sliding runner could be substituted therefor. The shaft 17 is conveniently secured to the lower end of the steering post by means of a triangular plate 33 and a U bolt 34, the U bolt extending around the lower end 8 of the steering post as shown and having nuts 35 threaded on the ends which project through holes in the plate. There is a stud 36 on the lower end of the steering post provided for another purpose, as for example for fastening a hitch piece, and I utilize this stud for a third point of attachment of the plate and enter the stud through a hole in the plate and thread a nut thereon as shown. In that way no change is necessary on the tractor in attaching the present guide thereto. The universal joint connection 20 is provided by a cross 37 in one of whose crisscrossed portions a bolt 38 is entered to pivotally connect the piece to the laterally extending fork 39 provided on the front end of the steering shaft 17. Another bolt 40 entered in the other transverse portion of the cross 37 and through a fork 41 in the adjacent end of the laterally extending arm 19 provides a pivotal connection with the arm 19 in a plane at right angles to the bolt 38. The arm 19 is formed in two pieces 42 and 43 which are in telescoping relation, the piece 42 being tubular and having diametrically opposed holes through which a bolt 44 is entered to connect the pieces 42 and 43 with facility for endwise adjustment of the piece 43 in the tubular piece 42, there being a plurality of holes 45 provided in the piece 43 in longitudinally spaced relation to receive the bolt 44 in different positions of adjustment. The fork 29 for universally pivotally connecting the forwardly reaching arm 28 with the crossbeam 25 has a bolt 46 entered in registering holes in the two fingers of the fork and through diametrically opposed slots 47 provided in the wall of the tubular beam 25. In that way the arm 28 is free to be swung in a vertical plane and can also swing laterally. The length adjustment for the arm 19 provided at 44—45 permits placing the guide wheel 24 closer to or farther out from the steering shaft 17, and when such an adjustment is made, the crossbeam 25 will ordinarily be adjusted endwise to the same extent so as to maintain approximate parallelism between the forwardly reaching arm 28 and the steering shaft 17. On tractors not provided with holes 10 and 11, the crossbeam 25 is made shorter and fastened to the frame by means of a bracket.

A crank member 48, mounted in bearings 49 on top of the crossbeam 25, has a substantially horizontal arm 50 reaching forwardly over the rear end of the arm 28 and flexibly connected therewith by means of a chain 51. Another arm 52 on the crank member extends upwardly and has a link 53 pivotally connected to the upper end thereof and pivotally connected at its rear end to the trip lever 12. In that way the tractor guide is adapted to be raised and lowered by power, the same being raised in one-half revolution of the trip lever and lowered in the next half revolution thereof. Each half revolution, as previously explained, results from a movement of the hand lever 14 or a depression of the foot pedal 15.

In operation, the guide wheel 24 running in the furrow in close contact at all times with the land side keeps the dual front wheel 5 running on a line parallel with the furrow so that the other furrow or furrows being plowed are parallel to the furrow used as the guide. The operator is, therefore, free to attend to the plows and make whatever adjustments are called for. When running the tractor down the road, or wherever the guide wheel 24 is not to be used, the wheel is held elevated by means of the crank 48, the elevating and lowering of the guide wheel being done with power through the medium of the trip lever 12 and link 53 connected to the crank 48. Whenever the guide wheel 24 is elevated, the operator has perfect freedom in steering the tractor with the dual front wheel 5 because of the universal joints in the parallelogram guide structure at 20, 23, and 29. The guide wheel 24 obviously is in such closely spaced relation to the front end of the tractor that the operator does not have to exercise special precautions in running the tractor to avoid having the guide wheel run into fences and other obstructions because as a general rule the guide wheel 24 will pass by anything that the drive wheels 6 will clear.

It is believed the foregoing description conveys a good understanding of the objects and advantages of my invention. The appended claims have been drawn with a view to covering all legitimate modifications and adaptations.

I claim:

1. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof in rigid relation to the tractor, a laterally reaching guide arm substantially parallel to said support having a universal joint connection with the outer end of said steering shaft, a forwardly reaching guide arm substantially parallel to said steering shaft having a fork on the rear end embracing therein the outer end of said transverse support and connected thereto for swinging movement of said arm in a vertical plane and in a transverse plane, a furrow follower, and a support therefor having means thereon for pivotally connecting the other adjacent ends of the two guide arms on transverse axes for universal movement relative to one another.

2. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof in rigid relation to the tractor, a laterally reaching guide arm substantially parallel to said support having a universal joint connection with the outer end of said steering shaft, a forwardly reaching guide arm substantially parallel to said steering shaft having a universal joint connection with the outer end of said transverse support, the other adjacent ends of the two guide arms also having a universal joint connection, a furrow follower carried on said arms at their connected ends, and a crank member pivotally mounted on the transverse support and disposed lengthwise relative thereto and having a forwardly reaching crank arm extending over the rear end portion of the forwardly reaching guide arm and connected thereto, said crank member having means for communicating oscillatory movement thereto whereby to raise and lower the furrow follower.

3. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof, a laterally reaching guide arm substantially parallel to said support having a universal joint connection with the outer end of said steering shaft, a forwardly reaching guide arm substantially parallel to said steering shaft having a universal joint connection with the outer end of said transverse support, a furrow follower, a support therefor having pivotal connections in transverse planes with the other adjacent ends of the two guide arms, and a crank member pivotally mounted on the transverse support and disposed lengthwise relative thereto and having a forwardly reaching crank arm over and adjacent the rear end portion of the forwardly reaching guide arm and connected thereto, said crank member having means for communicating oscillatory movement thereto whereby to raise and lower the furrow follower out of and into operative position.

4. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof, a laterally reaching guide arm substantially parallel to said support having a universal joint connection with the outer end of said steering shaft, a forwardly reaching guide arm substantially parallel to said steering shaft having a universal joint connection with the outer end of said transverse support, the other adjacent ends of the two guide arms also having a universal joint connection, a furrow follower carried on said arms at their connected ends, a crank member pivotally mounted on the transverse support and disposed lengthwise relative thereto and having a forwardly reaching crank arm extending over the rear end portion of the forwardly reaching guide arm and connected thereto, said crank having another vertically extending arm on the other end thereof, and means for communicating oscillatory movement to said crank member, comprising a link pivotally connected at one end with said last mentioned arm, and a power operable rotary trip lever pivotally connected with the other end of said link, and arranged to be turned intermittently in one direction, a half revolution in each operation.

5. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof, a laterally reaching guide arm substantially parallel to said support having a universal joint connection with the outer end of said steering shaft, a forwardly reaching guide arm substantially parallel to said steering shaft having a universal joint connection with the outer end of said transverse support, a furrow follower, and a support therefor having pivotal connections in transverse planes with the other adjacent ends of the two guide arms, said transverse support being adjustable endwise with respect to the tractor in parallelism with the laterally reaching guide arm, and said laterally reaching guide arm being extensible, whereby to vary the spaced relation between the furrow follower and the steering shaft.

6. A tractor guide structure comprising a steering shaft adapted to be attached to a tractor so as to have horizontal angular movement with the front steering wheel of the tractor, a transverse support adapted to be attached to the tractor so as to extend outwardly substantially horizontally from one side thereof, a laterally reaching guide arm substantially parallel to said support having a universal joint connection with the outer end of said steering shaft, a forwardly reaching guide arm substantially parallel to said steering shaft having a universal joint connection with the outer end of said transverse support, the other adjacent ends of the two guide arms also having a universal joint connection, and a furrow follower adjacent said connection and movable vertically with said arms, the forwardly reaching guide arm being extensible with respect to the laterally reaching guide arm and the furrow follower.

7. In combination with a tractor having a frame and closely spaced front steering wheels carried on the lower projecting end portion of a steering post, a tractor guide structure comprising an attaching plate vertically disposed on the front of the lower projecting end portion of the steering post, a U bolt for surrounding said lower end portion and clamping said plate thereto, there being a projecting stud on said lower end portion of the steering post arranged to extend through an opening provided in said plate to prevent vertical displacement of said plate relative to said post, a steering shaft rigid with said plate and arranged to have horizontal angular movement with the front steering wheels of the tractor, and means for guiding said shaft so as to guide the tractor, comprising a laterally reaching arm on the front end of said steering shaft, a furrow follower carried on the outer end of said arm, and a forwardly reaching arm on the front end of the tractor connected to the outer end of the laterally reaching arm and arranged to raise and lower the furrow follower by oscillatory movement of said forwardly reaching arm.

8. A tractor comprising in combination a frame having front steering wheels mounted for angular movement about a vertical axis, said tractor frame having a substantially horizontal transverse hole provided therein, a crossbeam demountably received in said hole so as to extend outward substantially horizontally from one side of the tractor frame, means for securing said beam in place in said hole, and a tractor guide structure comprising a steering shaft attached to the tractor so as to have horizontal angular movement with the front steering wheels, a laterally reaching arm universally pivotally connected to the front end of said shaft, a furrow follower pivoted on the outer end of said arm, and a forwardly reaching arm having universal pivotal connection at one end with the outer end of said crossbeam and having a pivotal connection with the furrow follower in transverse relation to its pivotal connection with the laterally reaching arm.

9. A tractor as set forth in claim 8, including a rotary trip lever mounted on the tractor frame behind the hole receiving the crossbeam, and arranged to be rotated intermittently in one direction a half revolution upon each operation, and means for raising and lowering the furrow follower comprising a crank member pivotally mounted on the crossbeam, and having connection on the one hand with the forwardly reaching arm, and having connection on the other hand with the trip lever.

10. In a tractor guide, the combination of a support mounted transversely rigidly on a tractor, a steering shaft connected with the front steering wheels of said tractor to have horizontal angular movement, a laterally reaching arm universally pivotally connected to said shaft, a furrow follower pivoted on a substantially vertical axis on the outer end of said arm, and a forwardly reaching arm universally pivotally connected at its rear end to the aforesaid transverse support and having a substantially horizontal pivotal connection with the furrow follower, the vertical and horizontal pivots providing a universal pivotal connection between the adjacent ends of the laterally reaching and forwardly reaching arms at the furrow follower.

11. A tractor guide as set forth in claim 10, wherein the horizontal pivotal connection between the forwardly reaching arm and the furrow follower includes an adjustment means whereby to adjust the position of the furrow follower forwardly and rearwardly with respect to the transverse support.

12. In a tractor guide, the combination of a support mounted transversely rigidly on a tractor, a steering shaft connected with the front steering wheels of said tractor to have horizontal angular movement, a laterally reaching arm universally pivotally connected to said shaft, a forwardly reaching arm universally pivotally connected at its rear end to the aforesaid transverse support, and a furrow follower at the adjacent ends of the laterally reaching and forwardly reaching arms and pivotally connected to one of said arms on a substantially horizontal axis and to the other of said arms on a substantially vertical axis, whereby the ends of said arms are universally pivotally connected.

13. A tractor guide as set forth in claim 12, wherein the forwardly reaching arm is extensible with respect to the laterally reaching arm and furrow follower.

14. In a tractor guide, the combination of a support mounted transversely rigidly on a tractor, a steering shaft connected with the front steering wheels of said tractor to have horizontal angular movement, a laterally reaching arm universally pivotally connected to said shaft, a forwardly reaching arm universally pivotally connected at its rear end to the aforesaid transverse support, a guide wheel, and a substantially horizontal spindle therefor having transverse portions on the inner end thereof adjacent the ends of the laterally reaching and forwardly reaching arms, one of said transverse portions being pivotally connected with the adjacent end of the laterally reaching arm on a substantially vertical axis and the other of said transverse portions being pivotally connected with the adjacent end of the forwardly reaching arm on a substantially horizontal axis, whereby said spindle provides a universal connection between the adjacent ends of said arms.

15. A tractor guide as set forth in claim 14, wherein the horizontal pivotal connection between the forwardly reaching arm and the spindle portion includes an adjustment means whereby to adjust the position of the guide wheel forwardly and rearwardly with respect to the transverse support.

16. In a tractor guide, the combination of a support mounted transversely on a tractor, a steering shaft connected with the steerable wheels of said tractor, a furrow follower, an arm connected with said shaft and extending laterally therefrom, another arm connected with said support and extending forwardly therefrom, said laterally reaching and forwardly reaching arms being interconnected, a furrow follower supported thereby and arranged to be elevated therewith, a crank member pivotally mounted on the transverse support on an axis extending lengthwise relative thereto and having a forwardly reaching crank arm connected with the aforesaid forwardly reaching arm and also having another vertically reaching arm, and means for communicating oscillatory movement to said crank member, comprising a link pivotally connected at one end with said last mentioned arm, and a power operable rotary trip lever pivotally connected with the other end of said link, and arranged to be turned intermittently in one direction, a half revolution in each operation.

GEORGE BOELMAN.